United States Patent [19]

Nishizawa

[11] Patent Number: 5,126,995
[45] Date of Patent: Jun. 30, 1992

[54] LIGHT SCANNING DEVICE

[75] Inventor: Kazushi Nishizawa, Hanno, Japan

[73] Assignee: Citizen Watch Co., Ltd., Tokyo, Japan

[21] Appl. No.: 503,929

[22] Filed: Apr. 4, 1990

[30] Foreign Application Priority Data

Apr. 7, 1989 [JP] Japan .................................. 1-88916

[51] Int. Cl.⁵ ......................... G11B 7/00; G01D 15/14
[52] U.S. Cl. .................... 369/118; 369/100; 369/44.24; 358/474; 346/160
[58] Field of Search ...................... 369/100, 118, 44.18, 369/44.19, 44.21, 44.22, 44.23, 44.24; 358/474; 346/160

[56] References Cited

U.S. PATENT DOCUMENTS

| 2,331,036 | 10/1943 | Maurer | 369/118 |
| 4,712,207 | 12/1987 | Reno | 369/100 |
| 4,945,423 | 7/1990 | Takanashi et al. | 346/160 |

FOREIGN PATENT DOCUMENTS 52-46051 4/1977 Japan .
61-184730 7/1986 Japan .

*Primary Examiner*—Roy N. Envall, Jr.
*Assistant Examiner*—Nabil Hindi
*Attorney, Agent, or Firm*—Finnegan, Henderson, Farabow, Garrett & Dunner

[57] ABSTRACT

A light scanning device comprising a source of a parallel light beam. The parallel light beam is passed through a first liquid crystal shutter and a first lens to converge at a focal point thereof. A rectangular light reflecting box with inside reflecting surfaces is arranged next to the first lens, so that a portion of the light beam passing through the first lens is able to directly pass through the light reflecting box and another portion of the light beam is reflected at the reflecting surfaces and then able to pass through light reflecting box, whereby multiple light paths are obtained. The passage of the multiple light paths is controlled by a second liquid crystal shutter located on the end of the rectangular light reflecting box, the second liquid crystal shutter having a plurality of selectively controllable light permeable regions. The light beam is finally impinged on a desired light recording media, and thus it is possible to scan the light recording media by controlling the second liquid crystal shutter to allow a portion of light beam of a selected light path to form a spot of light on the media.

13 Claims, 12 Drawing Sheets

| Z1 | Z2 | Z3 | Z4 | Z5 |
|----|----|----|----|----|
| Z6 | Z7 | Z8 | Z9 | Z10 |
| Z11 | Z12 | Z13 | Z14 | Z15 |
| Z16 | Z17 | Z18 | Z19 | Z20 |
| Z21 | Z22 | Z23 | Z24 | Z25 |

| S1 | S2 | S3 | S4 | S5 |
|----|----|----|----|----|
| S6 | S7 | S8 | S9 | S10 |
| S11 | S12 | S13 | S14 | S15 |
| S16 | S17 | S18 | S19 | S20 |
| S21 | S22 | S23 | S24 | S25 |

LIGHT SCANNING DEVICE

BACKGROUND OF THE INVENTION

1. Field of the Invention

The present invention relates to a light scanning device used, for example, for reading and writing data to a light recording media, such as an optical card or an optical disk.

2. Description of the Related Art

Conventional scanning devices use relatively movable parts to scan a media; for example, in a data reading and/or writing device disclosed in Japanese Examined Patent (Kokoku) No. 52-46051, an optical card is moved in one direction at a constant speed and an optical pickup is moved in another direction perpendicular to the card moving direction, or is rotated, to scan the optical card in two dimensions, and in Japanese Unexamined Patent (Kokai) No. 61-184730, an optical card is rotated and an optical pickup is moved in one direction to scan the optical card in two dimensions. Namely, these optical disk devices scan the optical card in two dimensions by rotating the optical card at a constant speed and moving an optical pickup radially over the optical card.

Accordingly, in a conventional optical data reading and/or writing device, it is necessary to provide a mechanical actuator, such as an electric motor, to move an optical media, and an optical media thus forcibly moved is often affected by mechanical oscillation and the force of gravity. It is also necessary to provide an accurate system and a large control format to move the optical pickup to a precise position in relation to the optical media, and since the scanning movement is mechanically accomplished, a delay occurs in the access to data. Also, a problem of a high cost of the device arises due to the need to use relatively expensive components.

SUMMARY OF THE INVENTION

An object of the present invention is to solve the above problems and to provide a light scanning device by which an optical media and an optical pickup can be fixedly positioned, and thus an oscillationless, relatively simple, and cheap data reading and/or writing device can be obtained.

According to the present invention, there is provided a light scanning device comprising: light source means emitting a parallel light beam with an optical axis; a first shutter means arranged on said optical axis and having a first light permeable area; a first lens means arranged on said optical axis for converging a parallel light beam passing through said first shutter means and having a focal length; a light reflecting body arranged on said optical axis and having at least a pair of spaced reflecting surfaces extending on either side of said optical axis and in parallel to each other in an inwardly facing relationship, a portion of the light beam passing through said first lens means being able to directly pass through said light reflecting body between said reflecting surfaces, and another portion of the light beam being reflected at at least one of said reflecting surfaces and then able to pass through said light reflecting body; a second liquid crystal shutter means arranged on said optical axis on the side of said light reflecting body remote from said first lens means and having a second light permeable area, said second light permeable area being divided into a plurality of selectively controllable light permeable regions; means for selectively activating each of said light permeable regions of said second shutter means; a second lens means arranged on said optical axis for converging a light beam passing through said second shutter means; means for positioning a desired light recording media on said optical axis at a predetermined distance from said second lens means, so that the light beam passing through said second lens means forms at least a spot of light on said media at a position depending on a selected light permeable region of said second shutter means; and means for determining whether or not a spot of light is formed at a desired position on said light recording media.

BRIEF DESCRIPTION OF THE DRAWINGS

The present invention will become more apparent from the following description of the preferred embodiment with reference to the accompanying drawings; in which.

DESCRIPTION OF THE PREFERRED EMBODIMENTS

Figure 1:
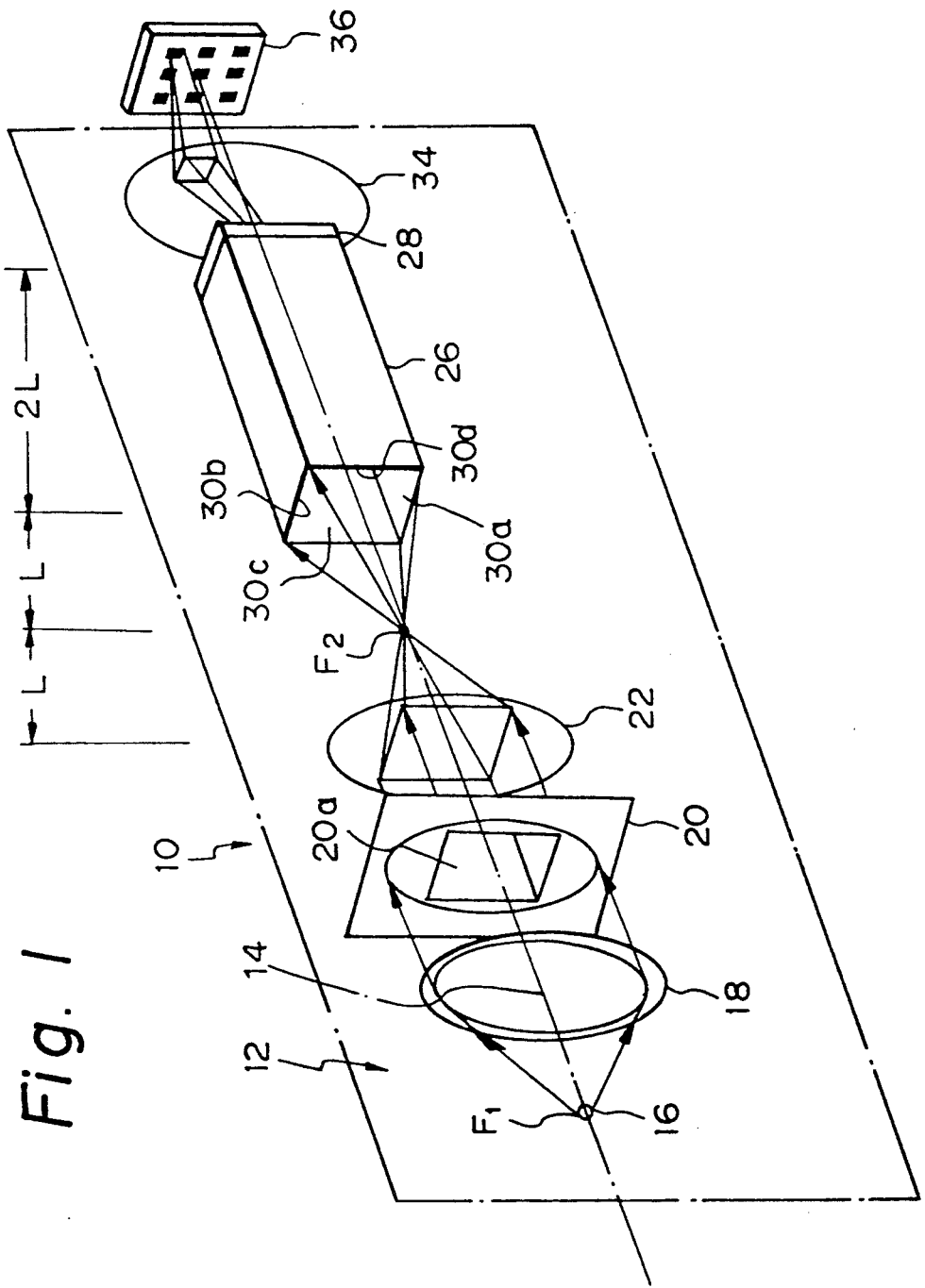
FIG. 1 is a diagrammatic perspective view of the first embodiment of the light scanning device according to the present invention, illustrating the principle of the present invention.

In FIG. 1, the light scanning device 10 according to the present invention includes a light source means 12 for emitting a parallel light beam with an optical axis 14. The light source means 12 preferably comprises a point source 16 formed by a semiconductor laser and a source lens 18. The source lens 18 is a convex lens having a focal point $F_1$, and the point source 16 is arranged at the focal point $F_1$ so that a diverging light beam from the point source 16 is converted to a parallel light beam at the source lens 18. The scanning device 10 also includes other optical components which are arranged on the optical axis 14, but the light receiving means is omitted in this first embodiment.

The light scanning device 10 includes a first liquid crystal shutter 20 and a first convex lens 22 having a focal point $F_2$. The first liquid crystal shutter 20 has a first effective light permeable area 20a in the shape of a square aperture and a part of the parallel light beam from the source lens 18 can pass through only the first light permeable area 20a and impinge on the first convex lens 22 at the same surface area thereof as the first light permeable area 20a.

Figure 2:
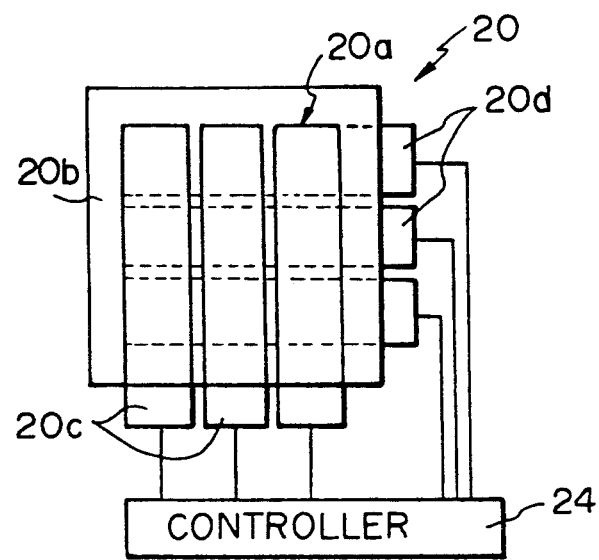
FIG. 2 is a diagrammatic plan view of the first liquid crystal shutter in FIG. 1, on an enlarged scale.
Figure 3:
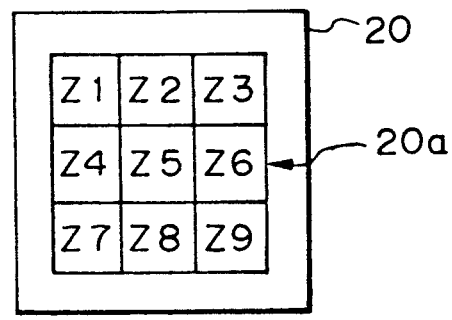
FIG. 3 shows light permeable zones of the first liquid crystal shutter.

Referring to FIG. 2, the first liquid crystal shutter 20 preferably comprises a well known liquid crystal cell 20b, and a matrix electrode arrangement comprising vertical electrodes 20c on the surface of the liquid crystal cell 20b, and horizontal electrodes 20d on the bottom surface of the liquid crystal cell 20b. The vertical electrodes 20c and the horizontal electrodes 20d are connected to an electric controller 24. The first light permeable area 20a is formed by an area whereat all of the vertical electrodes 20c and horizontal electrodes 20d overlap. The first light permeable area 20a is divided into a plurality of light permeable zones Z1 to Z9, as shown in FIG. 3, and each of the light permeable zones Z1 to Z9 is formed by an area whereat corresponding vertical electrodes 20c and horizontal electrodes 20d overlap. The electric controller 24 can selectively activate each of the light permeable zones Z1 to Z9, independently, in any combination of the light permeable zones Z1 to Z9, or as a whole. The first liquid crystal shutter 20 or a portion thereof is impermeable to the light beam when a voltage is not applied between the cooperating vertical electrodes 20c and horizontal electrodes 20d, and permeable to the light beam when the voltage is applied between the cooperating vertical electrodes 20c and horizontal electrodes 20d.

Figure 4:
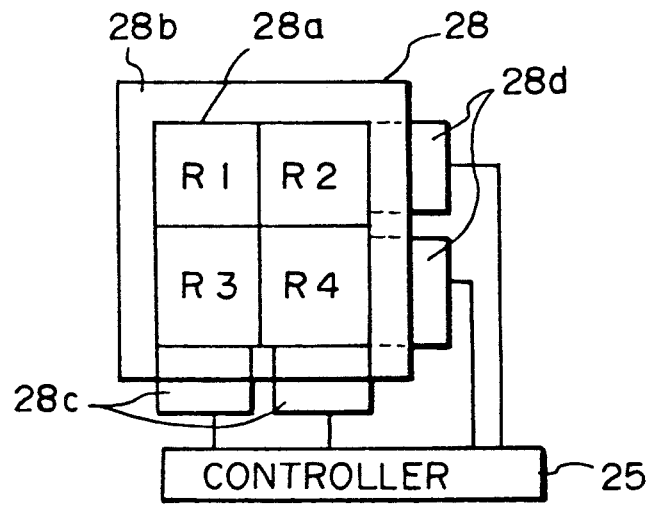
FIG. 4 is a diagrammatic plan view of the second liquid crystal shutter of FIG. 1.

In FIG. 1, the light scanning device 10 also includes a rectangular light reflecting box 26 with a proximal end and a distal end, and a length between the opposite ends, and a second liquid crystal shutter 28 attached to the distal end of the rectangular light reflecting box 26. The second liquid crystal shutter 28 is similar to the first liquid crystal shutter 20, and comprises a liquid crystal cell 28b, vertical electrodes 28c, and horizontal electrodes 28d, and accordingly, the second liquid crystal shutter 28 has a second effective light permeable area 28a which is divided into a plurality of light permeable regions R1 to R4, as shown in FIG. 4. Note, nine light permeable zones Z1 to Z9 and four light permeable regions R1 to R4 are shown in FIGS. 3 and 4, respectively, but it is possible to change the number of light permeable zones and regions. In the following description, however, nine light permeable zones Z1 to Z9 and four light permeable regions R1 to R4 are used to identify the subdivided positions; for example, the light permeable zone Z1 (or the light permeable region R1) represents a left top position. Also, it is possible for the first and the second liquid crystal shutters 20 and 28 to have any electrode arrangement other than those illustrated herein.

Referring to FIG. 1, the rectangular light reflecting box 26 includes a first pair of spaced reflecting surfaces 30a and 30b, and a second pair of spaced reflecting surfaces 30c and 30d perpendicular to the first reflecting surfaces 30a and 30b at inner surfaces thereof. The outer surface of the rectangular light reflecting box 26 can be covered with a black material. In principle, it is possible to replace the light reflecting box 26 with any polygonal light reflecting box or prism with additional reflecting surfaces at outer surfaces thereof.

Each pair of reflecting surfaces 30a and 30b, and 30c and 30d extend on either side of the optical axis 14 and in parallel to each other in an inwardly facing mirror image relationship. The reflecting surfaces 30a and 30b, and 30c and 30d define an aperture 32 (FIG. 5A), or a transparent body in the case of a prism. A portion of a light beam passing through the first convex lens 22 can directly pass through the aperture 32 between the reflecting surfaces 30a and 30b, and 30c and 30d, and another portion of the light beam is reflected at the reflecting surfaces 30a and 30b, and 30c and 30d, once or twice or more, and then passed through the rectangular light reflecting box 26.

The first convex lens 22 has the focal point $F_2$ and the focal length L, and the second liquid crystal shutter 28 is located at a position apart from the first convex lens 22 by a distance of an even number times the focal length L of the first lens 22. In this embodiment, the rectangular light reflecting box 26 has a length of 2L between the proximal end and the distal end, and second liquid crystal shutter 28 is located at a position apart from the first convex lens 22 by a distance of 4L. Also, the cross-sectional area of the aperture 32 is a congruence of the second light permeable area 28a, so that the distance between the reflecting surfaces 30a and 30b, or 30c and 30d is equal to a corresponding width of the second light permeable area 28a. Also, the first light permeable area 20a is equal to the second light permeable area 28a.

Further, the light scanning device 10 comprises a second convex lens 34 for converging a light beam passing through the second liquid crystal shutter 28, and means for positioning a desired light recording media 36 at a predetermined distance from the second convex lens 34 so that light beam passing through the second convex lens 34 forms spots of light on the light recording media 36. The light recording media 36 may be an optical card or an optical disk, and may be placed on any surface, for example, a table. The light scanning device 10 may have an outer frame (not shown) or the like to be placed relative to the surface of the table so that the light recording media 36 is at a predetermined distance from the second convex lens 34.

The principle spot-forming operation on the light recording media 36 will be described with reference to FIGS. 5A to 5D. FIGS. 5A to 5D are views respectively illustrating light passages in various conditions of the first liquid crystal shutter 20 when the second liquid crystal shutter 28 is fully open.

Figure 5A:
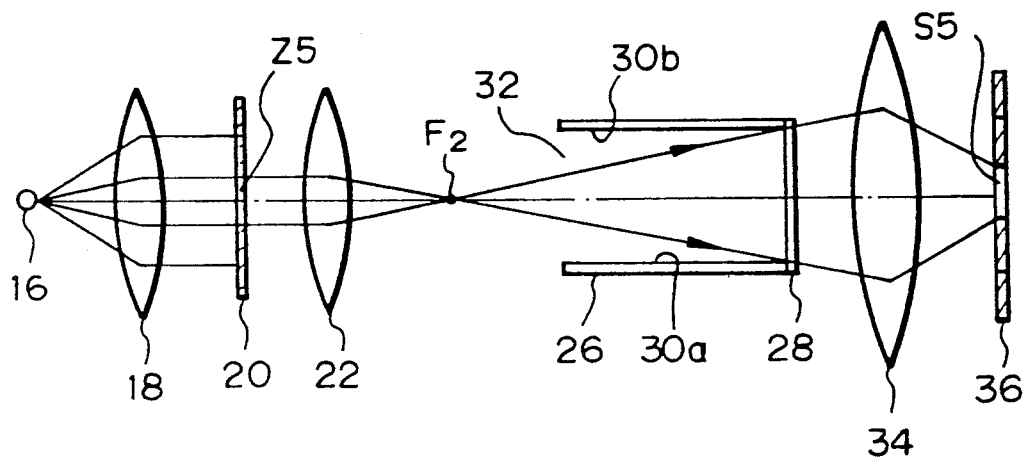
FIGS. 5A to 5D are views respectively illustrating light passages in various conditions of the first liquid crystal shutter of FIG. 3 when the second liquid crystal shutter is fully open.
Figure 6A:
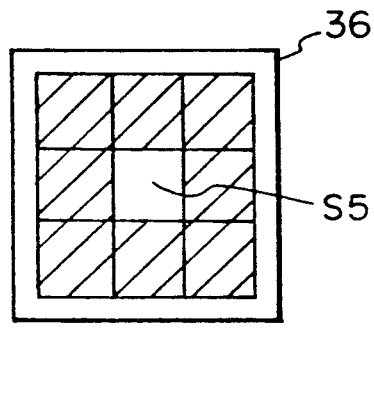
FIGS. 6A to 6D are views of spots of light on the optical recording media, obtained depending on the conditions of the first liquid crystal shutter of FIGS. 5A to 5D, respectively.

In FIG. 5A, the first liquid crystal shutter 20 is activated such that only the central light permeable zone Z5 (FIG. 3) is substantially transparent to the light beam. A portion of parallel light beam passes through the central light permeable zone Z5 and reaches the first convex lens 22, and the parallel light beam is thus converged to the focal point $F_2$ and then diverged. The diverging light beam reaches the entire light permeable area 28a of the second liquid crystal shutter 28 and passes to the second convex lens 34, where the light beam is converged to form a spot of light on the light recording media 36. As shown in FIG. 6A, the spot of light is converged on the light recording media 36 at a position S5 which corresponds to the position of the light permeable zone Z5 in the first liquid crystal shutter 20.

Figure 5B:
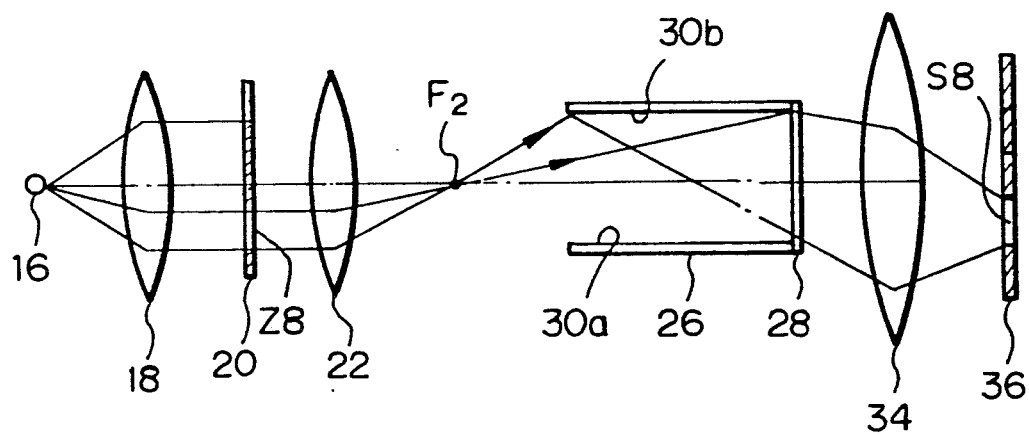
Figure 6B:
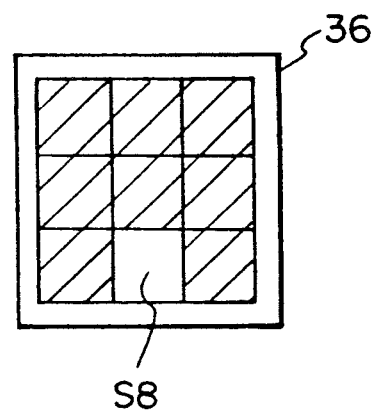

In FIG. 5B, the first liquid crystal shutter 20 is activated such that only the central bottom light permeable zone Z8 (FIG. 3) is substantially transparent to the light beam. A portion of a parallel light beam passes through the central bottom light permeable zone Z8 and is converged toward the focal point $F_2$ by the first convex lens 22 and diverged therefrom. The light beam is reflected at the reflecting surface 30b of the rectangular light reflecting box 26 between the proximal end and the distal end of the reflecting surface 30b, and then beam passes through the second liquid crystal shutter 28 and the second convex lens 34 to form a spot of light on the light recording media 36. This spot of light on the light recording media 36 is shown in FIG. 6B, in which the spot of light S8 is converged at a position corresponding to the light permeable zone Z8 in the first liquid crystal shutter 20.

Figure 5C:
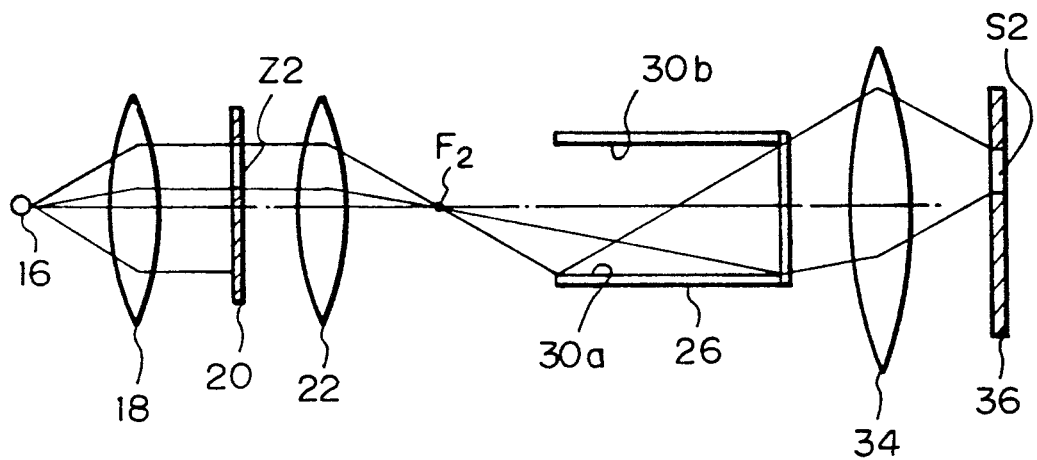
Figure 6C:
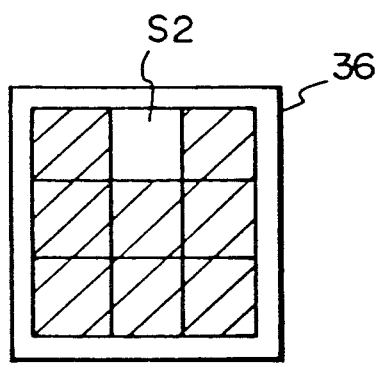

In FIG. 5C, the central top light permeable zone Z2 is substantially transparent to the light beam, and this is a mirror image of the central bottom light permeable zone Z8 regarding the optical axis 14, so that light beam is reflected at the reflecting surface 30a and forms a spot of light S2 on the light recording media 36, as shown in FIG. 6C.

Figure 5D:
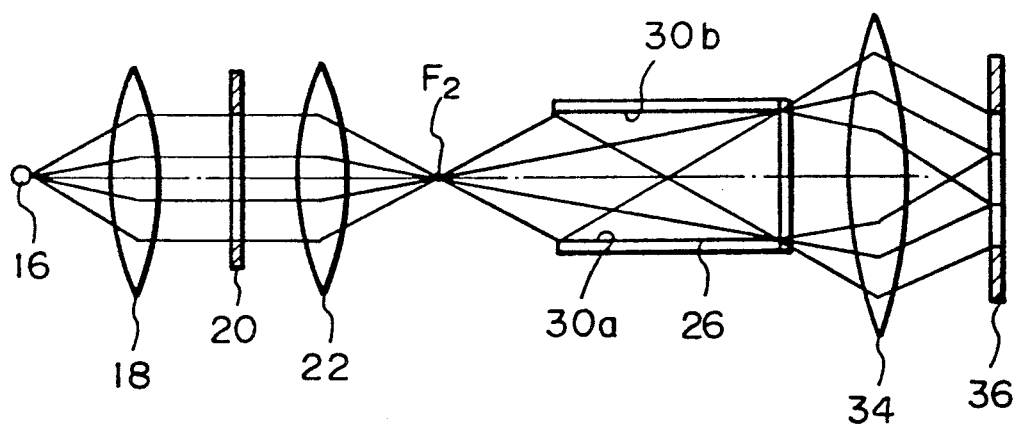
Figure 6D:
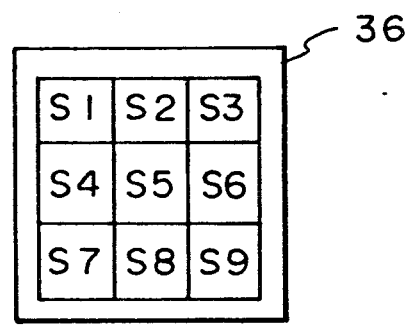

In FIG. 5D, all of the light permeable zones Z1 to Z9 are substantially transparent to the light beam, and thus spots of lights S1 to S9 are formed on the light recording media 36 as shown in FIG. 6D.

The second liquid crystal shutter 28 is controlled in combination with the control of the first liquid crystal shutter 20.

Figure 7A:
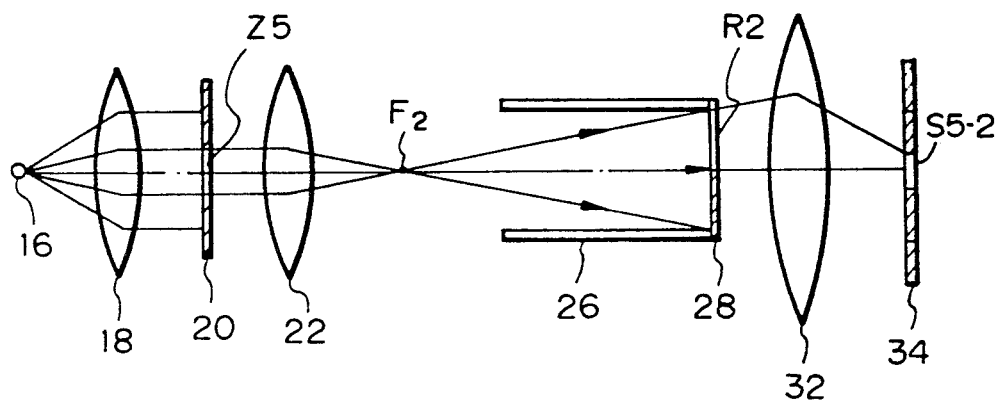
FIGS. 7A and 7B are views illustrating light passages when the second liquid crystal shutter is actuated, and the first liquid crystal shutter is in the condition of FIGS. 5A and 5D, respectively.
Figure 8A:
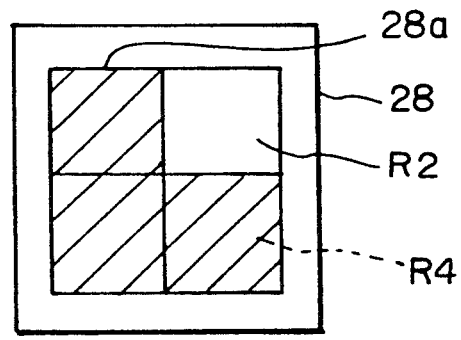
FIGS. 8A shows the condition of the second liquid crystal shutter of FIGS. 7A and 7B.
Figure 8B:
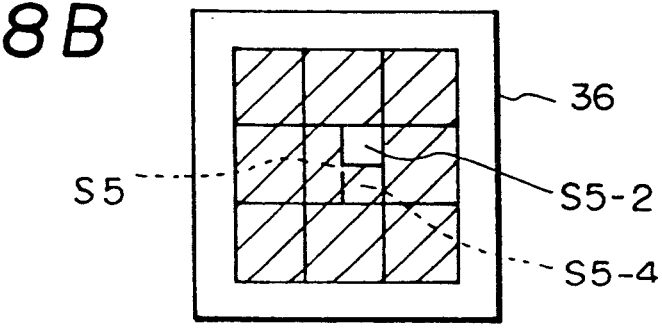
FIGS. 8B and 8C are views illustrating spots of light on the optical recording media, obtained depending on the conditions of the first liquid crystal shutter of FIGS. 7A and 7B, respectively, and on the second liquid crystal shutter of FIG. 8A.

FIG. 7A shows that the first liquid crystal shutter 20 is similarly controlled to that of FIG. 5A, so that a spot of light S5 will be formed on the light recording media 36, and the second liquid crystal shutter 28 is activated such that only the right top light permeable region R2 (FIG. 8A) is substantially transparent to the light beam. Thus the light beam which would form a spot of light S5 if the second liquid crystal shutter 28 were fully open is partly obstructed by the second liquid crystal shutter 28, as shown in FIG. 7A, and thus the spot of light S5 is further subdivided by the second liquid crystal shutter 28. Therefore, a spot of light S5-2 is formed on the light recording media 36, as shown in FIG. 8B in which the spot of light S5-2 is at a right top (R2) position of a possible spot of light S5. If the right bottom light permeable region R4 is substantially transparent to the light beam, a spot of light S5-4 will be formed on the light recording media 36 at a right bottom (R4) position of a possible spot of light S5.

Figure 7B:
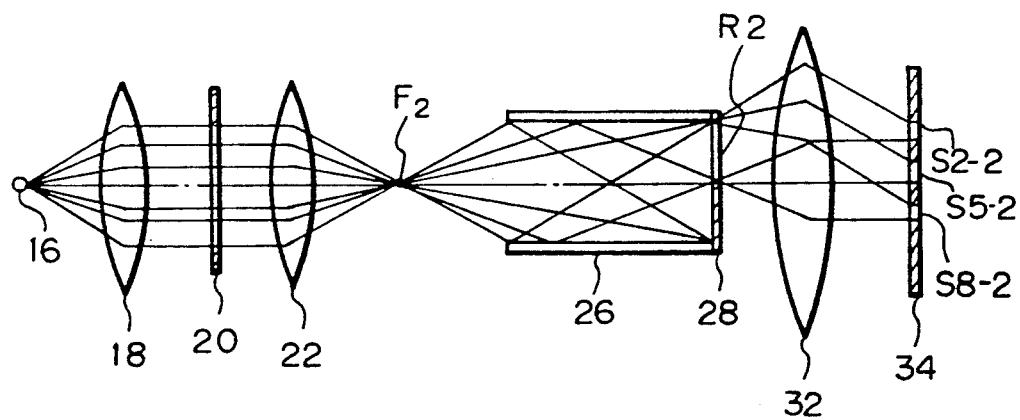
Figure 8C:
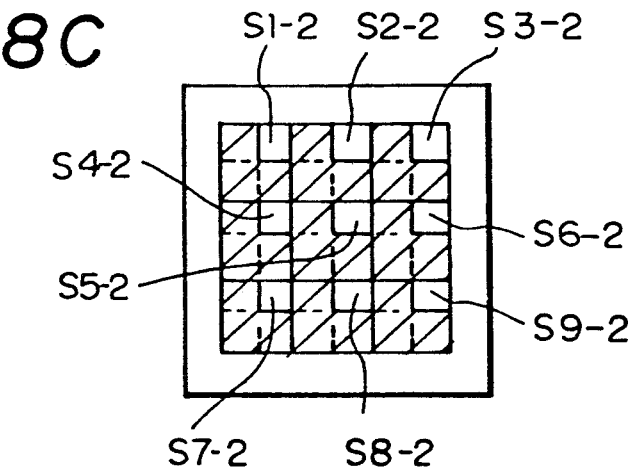

FIG. 7B shows a condition in which the first liquid crystal shutter 20 is controlled at a position of FIG. 5D so that spots of light S1 to S9 (FIG. 6D) are formed on the light recording media 36, and the right top light permeable region R2 of the second liquid crystal shutter 28 is substantially transparent to the light beam, and thus each part of the light beam which would form each of the spots of light S1 to S9 is partly obstructed, and accordingly, spots of light S1-2 to S9-2 are formed on the light recording media 36, as shown in FIG. 8C. The second liquid crystal shutter 28 can be also activated such that the other light permeable region is substantially transparent to the light beam. It will be understood that, in total, 36 spots of light can be obtained, and it is possible to scan the light recording media 36 by adequately controlling the first and second liquid crystal shutters 20 and 28. Note, the number of light permeable zones Z is "m" and the number of light permeable regions R is "n", and thus the possible number of spots of light is "m×n".

Preferably, the number of light permeable zones Z "m" is changed in accordance with the length of the rectangular light reflecting box 26, so that the liquid crystal shutter 28 is located at a position apart from the first lens 22 by a distance of an even number times the focal length 2aL (a: natural number), and the number of light permeable zones Z "m" is equal to $(2a-1)^2$. Therefore, if $a=2$, $m=(4-1)^2=9$, as in the case of FIG. 1, and if $a=3$, $m=(6-1)^2=25$.

Figures 9A, 9B, 11:
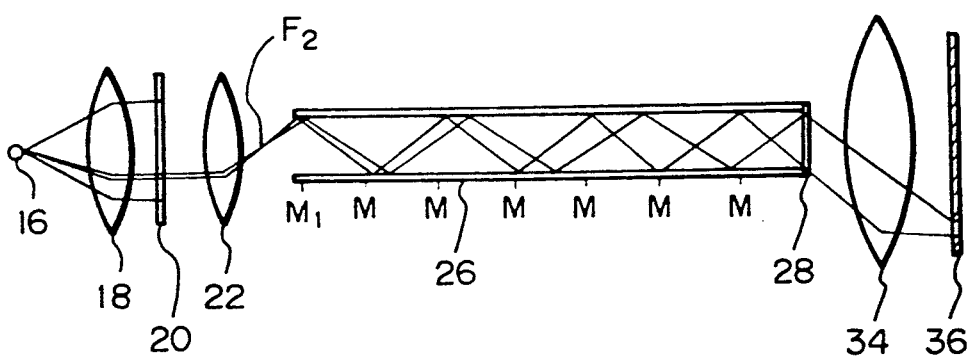
FIG. 9A shows a modification of the first liquid crystal shutter.
FIG. 9B is a view of an optical recording media having an effective recording area according to the first liquid crystal shutter of FIGS. 9A.
FIG. 11 is a view illustrating light passages of a further modification of the optical scanning device with an elongated reflecting mirror.
Figure 10A:
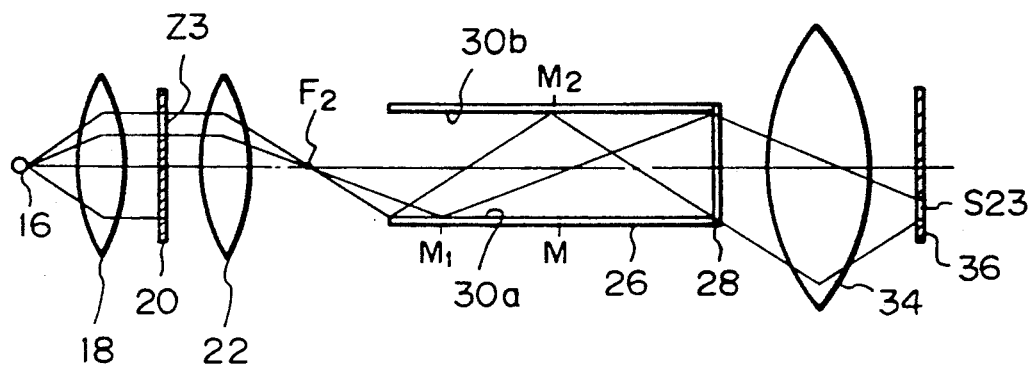
FIGS. 10 to 10C are views respectively illustrating light passages in various conditions of the first liquid crystal shutter of FIG. 9A when the second liquid crystal shutter is fully open.
Figure 10B:
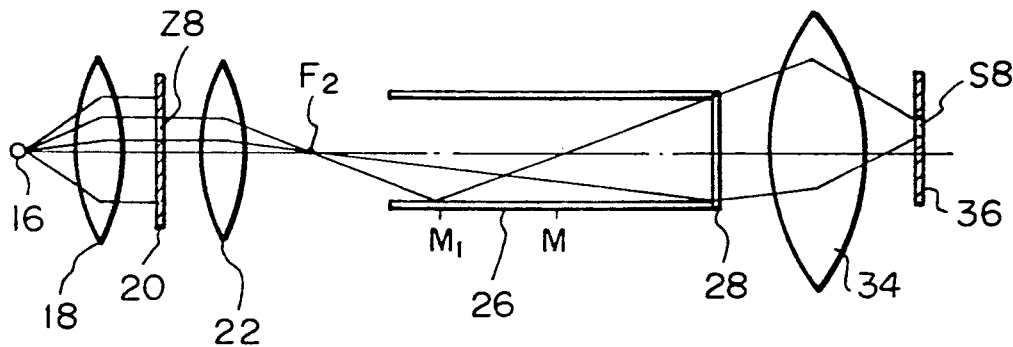
Figure 10C:
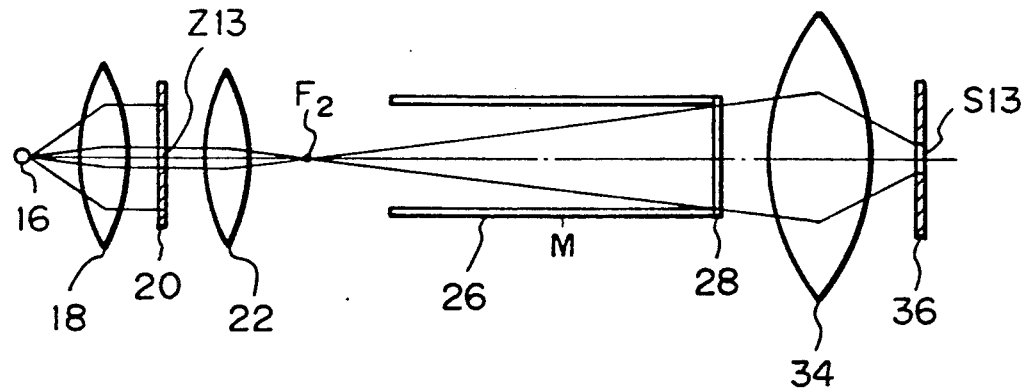

FIG. 9A shows a first liquid crystal shutter 20 with 25 light permeable zones Z1 to Z25 when $a=3$, and FIGS. 10A to 10C show an arrangement with the liquid crystal shutter 28 located at a distance 6L from the first lens 22. The rectangular light reflecting box 26 has a length of 4L, and a midpoint thereof is shown by M. The second liquid crystal shutter 28 is fully open throughout FIGS. 10A to 10C, but can be controlled, in addition to the control of the first liquid crystal shutter 20, to subdivide a spot of light defined by the first liquid crystal shutter 20 in a manner previously described.

In FIG. 10A, the central top light permeable zone Z3 (FIG. 9A) of the first liquid crystal shutter 20 is substantially transparent to the light beam. The parallel light beam passes through the central top bottom light permeable zone Z3 and the first convex lens 22 and is then reflected at the reflecting surfaces 30a between the proximal end and a point $M_1$ on the side of the midpoint M from the proximal end of the rectangular light reflecting box 26. The reflected light beam is further reflected at the reflecting surfaces 30b between a point $M_2$ and the distal end of the rectangular light reflecting box 26, and the light beam then passes through the second liquid crystal shutter 28 and the second convex lens 34 to form a spot of light S23 on the light recording media 36. This spot of light S23 is at a central bottom position on the light recording media 36 (FIG. 9B), but it will be understood that the spot of light S23 has a close relationship with the central top light permeable zone Z3 in the first liquid crystal shutter 20.

In FIG. 10B, the central midtop light permeable zone Z8 (FIG. 9A) of the first liquid crystal shutter 20 is substantially transparent to the light beam. The parallel light beam passes through the central midtop bottom light permeable zone Z8 and the first convex lens 22 and is then reflected at the reflecting surfaces 30a between the point $M_1$ and the distal end of the rectangular light reflecting box 26; once in this case. Then the light beam passes through the second liquid crystal shutter 28 and the second convex lens 34 to form a spot of light S8 on the light recording media 36. This spot of light S8 corresponds to the position of the central midtop light permeable zone Z8 in the first liquid crystal shutter 20.

In FIG. 10C, the parallel light beam passes through the central light permeable zone Z13 and passes through the rectangular light reflecting box 26 without reflection. The light beam then passes through the second liquid crystal shutter 28 and the second convex lens 34 to form a spot of light S13 on the light recording media 36, corresponding to the central light permeable zone Z13 in the first liquid crystal shutter 20. In this way, it is possible to scan the light recording media 36 by controlling the first and second liquid crystal shutters 20 and 28 even if the number of light permeable zones Z "m" and the number of light permeable regions R "n" are increased.

Note, the extent of the light beam at the second liquid crystal shutter 28 is made constant throughout the conditions of FIGs. 10A to 10C, i.e., the extent of light beam at the second liquid crystal shutter 28 is equal to an effective light permeable area 28a of the second liquid crystal shutter 28, by adequately selecting the point $M_1$ between the proximal end and the midpoint M. This enables the second liquid crystal shutter 28 to further subdivide a possible spot of light defined by the first liquid crystal shutter 20.

This applies also to the other arrangement, in which the liquid crystal shutter 28 is located at a position apart from the first convex lens 22 by a distance of 2aL. For example, FIG. 11 shows the arrangement in which the distance is 16L (namely, a = 8), and the number of light permeable zones Z is $(2 \times 8 - 1)^2 = 15^2$.

A further example is shown below;
a = 15
Diameter of first convex lens 22: 8 mm
Focal length L of first convex lens 22: 5 mm
Distance $2aL = 2 \times 15 \times 5$: 150 mm
Number of light permeable zones Z: $(2 \times 15 - 1)^2 = 29^2$
First effective light permeable area: $5 \times 5$ mm$^2$
Diameter of each Zone Z: 140 μm
Number of light permeable Regions R: $59^2$
Second effective light permeable area: $5 \times 5$ mm$^2$
Diameter of each region R: 70 μm
Diameter of each spot S: 3 μm
Number of spots S: $29^2 \times 59^2$ This corresponds to a memory of about 2M bits or 366K bytes.

Figure 12:
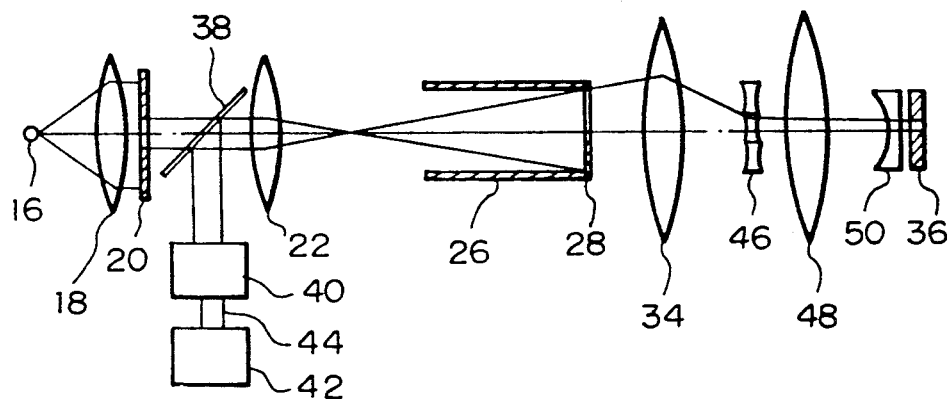
FIG. 12 is diagrammatic view of the light scanning device according to the second embodiment of the present invention.

FIG. 12 shows an optical scanning reading and writing device for an optical card according to the second embodiment of the present invention. A beam splitter 38 is interposed between the first liquid crystal shutter 20 and the first convex lens 22. The beam splitter 38 is a half mirror which allows the source light beam to pass therethrough toward the light recording media 36, and the returning light beam reflected at the light recording media 36 to be reflected thereat and deflected to a light receiving means 40. The light receiving means 40 comprises semiconductor means for receiving the reflected light beam and outputting electric signals for determining whether or not a spot of light is formed at a desired position on the light recording media 36.

An electric control device 42 is connected to the light receiving means 40 via a parallel interface 44. The electric control device 42 comprises a microcomputer system including a microprocessor unit (not shown) and can further include the functions of the controller 24 of FIG. 2 and the controller 25 of FIG. 4.

In FIG. 12, a further lens means is provided between the second convex lens 34 and the light recording media 36, to generate a sharp spot of light on the light recording media 36. This means comprises a concave lens array 46, a further convex lens 48, and a concave lens 50.

Figure 13A:
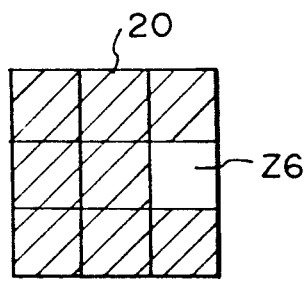
FIG. 13A is a view of the first liquid crystal shutter of FIG. 12.
Figure 13B:
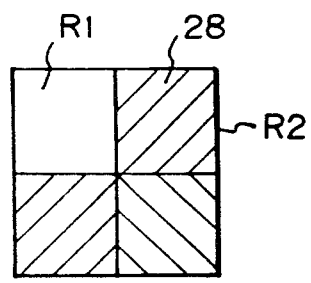
FIG. 13B is a view of the second liquid crystal shutter of FIG. 12.
Figure 13C:
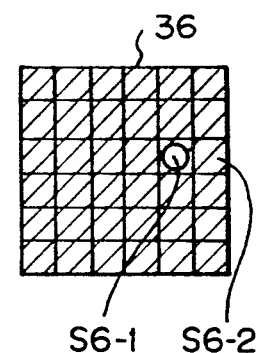
FIG. 13C is a view of a spot of light on the optical recording media, obtained depending on the conditions of first and second liquid crystal shutters of FIGS. 13A and 13B.

The operation of the light scanning device 10 of FIG. 12 will be apparent from the foregoing description, and is briefly summarized here. In the reading or writing operation, it is possible to scan the light recording media 36, one spot by one spot, by independently actuating the first and second liquid crystal shutters 20 and 28. For example, if the light permeable zone Z6 and the light permeable region R1 are transparent to the light beam, a spot of light S6-1 is formed on the light recording media 36, as shown in FIGS. 13A to 13C, and such a spot of light S6-1 can be read by the light receiving means 40 and the electric control device 42, or written on the light recording media 36. Then a next spot of light S6-2 will be sequentially formed by actuating the light permeable zone Z6 and the light permeable region R2.

It is also possible for a plurality of spots of light S to be formed on the light recording media 36, at once.

Figure 14:
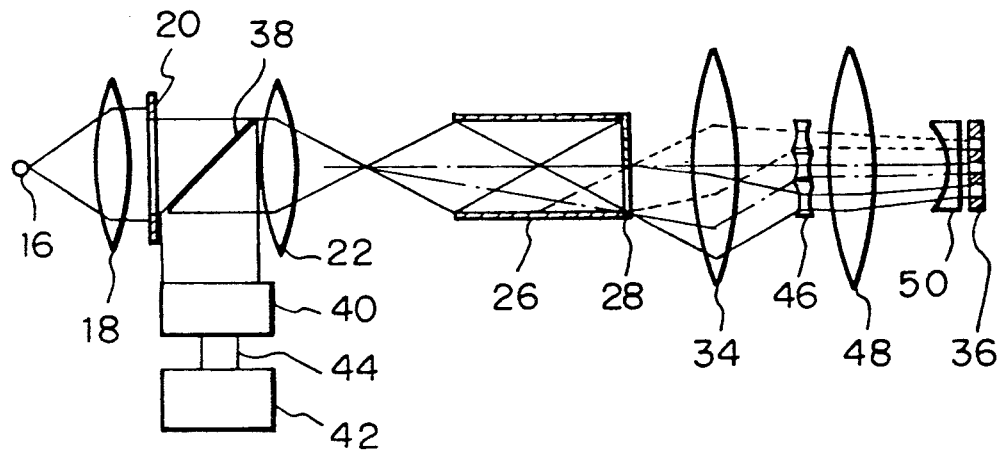
FIG. 14 is a diagrammatic view of the light scanning device according to the third embodiment of the present invention.
Figure 15:
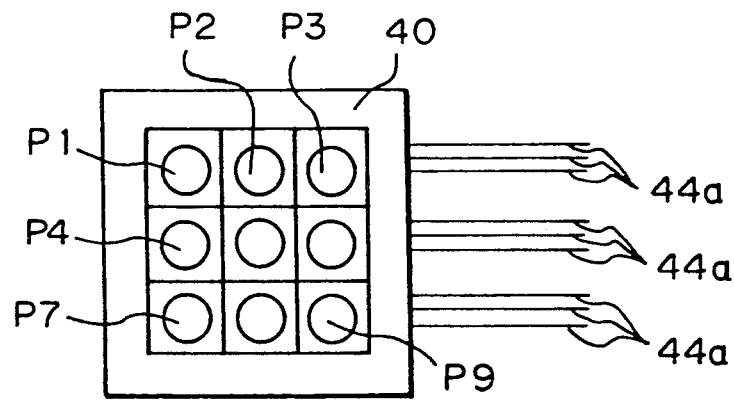
FIG. 15 is a diagrammatic view of the light receiving array of FIG. 14.

FIG. 14 shows an optical scanning read device for an optical card according to the third embodiment of the present invention. This embodiment is similar to that of FIG. 12, except that the light receiving means 40 comprises a light receiving array with a plurality of light receiving elements P1 to P9, as shown in FIG. 15, which are arranged in a pattern corresponding to that of the light permeable zones Z of the first liquid crystal shutter 20. Each of the light receiving elements P1 to P9 is connected to the electric control device 42 via a respective parallel interface line 44a, and therefore, the first liquid crystal shutter 20 can be used in a fully open position, as shown in FIG. 14.

Figure 16A:
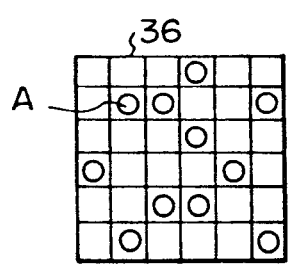
FIG. 16A is an example of the light recording media with a predetermined data pattern.
Figure 16B:
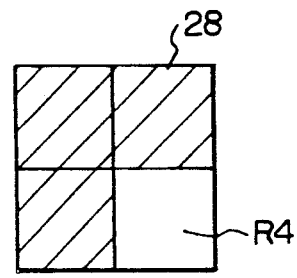
FIG. 16B is a diagrammatic plan view of the second liquid crystal shutter of FIG. 14.
Figure 16C:
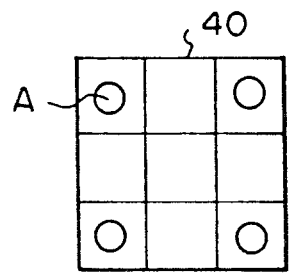
FIG. 16C is a view of the light receiving array of FIG. 14, receiving a light beam reflected at the optical recording media with the predetermined data pattern of FIG. 16A.
Figure 16D:
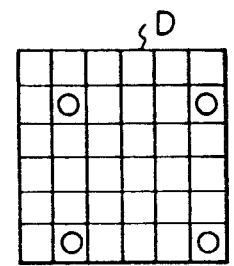
FIG. 16D is a view illustrating how the pattern of FIG. 16A can be identified from the result of FIG. 16C.

For the operation of this arrangement in which the first liquid crystal shutter 20 is fully open, reference should be made to the description of FIGS. 5D, 6D, 7B, and 8C. In FIG. 14, it is assumed that the light recording media 36 carries predetermined data (for example, in the form of pits), as shown in FIG. 16A, and the light permeable region R4 is actuated, as shown in FIG. 16B. In this case, the light receiving means 40 will receive the reflected light beam from the light recording media 36, as shown in FIG. 16C. From the result of FIG. 16C, the electric control device 42 can read the pattern of data D, as shown in FIG. 16D, since the electric control device 42 recognizes that the light permeable region R4 is actuated. Note, the point A in FIG. 16C corresponds to a spot A in FIG. 16A, and therefore, according to this embodiment, it is possible to scan multiple points at one time.

Figure 17:
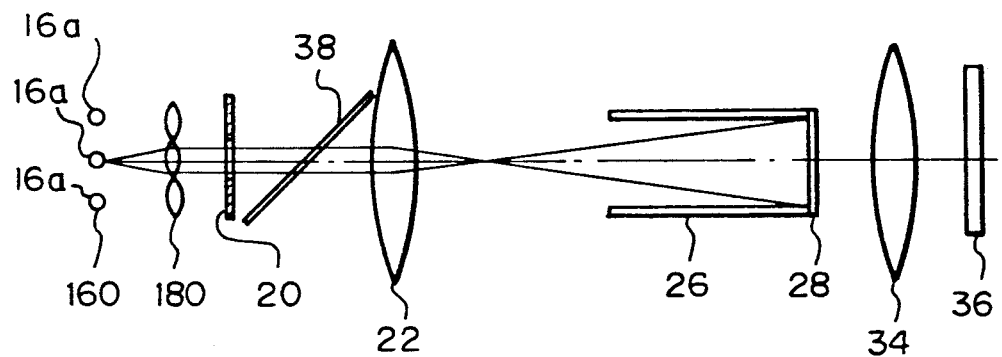
FIG. 17 is a diagrammatic view of the light scanning device according to the fourth embodiment of the present invention, with a plurality of spot sources.

FIG. 17 shows the light scanning device according to the fourth embodiment of the present invention. The source of the light beam array 160 and a convex lens array 180 are provided as the single spot source 16 and the source convex lens 18 in the previous embodiments. The source of the light beam array 160 comprises a plurality of spot sources 16a, and each of the lenses of the convex lens array 180 is aligned with each spot source 16a to provide a parallel light beam for each light permeable zone Z of the first liquid crystal shutter 20. By selectively using the spot sources 16a in conformity with the activated light permeable zone Z, it is possible to reduce energy loss by the source. Writing can be carried out by the using the heat energy of the light beam, by increasing the power of source to more than when reading, or by increasing the irradiation time.

As explained above, the light scanning device according to the present invention is stationary, in which a light recording media and an optical pickup are fixed to each other, and a mechanical drive means is not used, and thus this light scanning device is less affected by oscillation and gravity and has a greater positioning freedom. When using the device as a reader, it is possible to read many data at a time and thus reduce data transmitting time. Also, it is possible to simplify a format to use the light scanning device, to thus increase the capacity and to reduce costs, due to the simple arrangement.

What is claimed is:

1. A light scanning device comprising:
   light source means for delivering a parallel light beam with an optical axis;
   a first liquid crystal shutter means arranged on said optical axis and having a first light permeable area;
   a first lens means arranged on said optical axis for converging a parallel light beam passing through said first shutter means, and having a focal length;
   a light reflecting body arranged on said optical axis and having at least a pair of spaced reflecting surfaces extending on either side of said optical axis and in parallel to each other in an inwardly facing relationship, a portion of a light beam passing through said first lens means being able to directly pass through said light reflecting body between said reflecting surfaces and another portion of a light beam being reflected at at least one of said reflecting surfaces and then able to pass through said light reflecting body;
   a second liquid crystal shutter means arranged on said optical axis on the side of said light reflecting body remote from said first lens means and having a second light permeable area, said second light permeable area being divided into a plurality of selectively controllable light permeable regions;
   means for selectively activating each of said light permeable regions of said second shutter means;
   a second lens means arranged on said optical axis for converging a light beam passing through said second shutter means;
   means for positioning a light recording media on said optical axis at a predetermined distance from said second lens means so that a light beam passing through said second lens means forms at least a spot of light on said media at a position depending on a selected light permeable region of said second shutter means; and
   means for determining whether a spot of light is formed at a desired position on said light recording media.

2. A light scanning device according to claim 1, wherein said light reflecting body has a length, a proximal end on the side of said first lens means and a distal end on the side of said second lens means, and the distance between said reflecting surfaces is equal to a corresponding width of said second light permeable area, said second shutter means being attached to said distal end of said reflecting box.

3. A light scanning device according to claim 2, wherein said first light permeable area is equal to said second light permeable area, and said second shutter means is located at a position apart from said first lens means by a distance of an even number times said focal length of said first lens means.

4. A light scanning device according to claim 3, wherein said light source means comprises at least one point source and at least one convex lens means having a focal point at which said at least one point source is positioned.

5. A light scanning device according to claim 4, wherein said one point source comprises a semiconductor laser.

6. A light scanning device according to claim 4, wherein said light source means comprises a plurality of point sources and a plurality of convex lens means, each of said one point sources being positioned at a focal point of the respective convex lens means.

7. A light scanning device according to claim 4, wherein said light reflecting body comprises at least one additional pair of spaced reflecting surfaces to form with said first pair of reflecting surfaces, a polygonal light reflecting prism with reflecting surfaces at outer surfaces thereof.

8. A light scanning device according to claim 4, wherein said light reflecting body comprises at least one additional pair of spaced reflecting surfaces to form with said first pair of reflecting surfaces, a polygonal light reflecting box with reflecting surfaces at inner surfaces thereof.

9. A light scanning device according to claim 8, wherein said light reflecting body comprises said first pair of reflecting surfaces and a second pair of reflecting surfaces perpendicular to each other to form a rectangular light reflecting box.

10. A light scanning device according to claim 8, wherein said first shutter means comprises a liquid crystal shutter with said first light permeable area, said first light permeable area being divided into a plurality of selectively controllable light permeable zones, and means provided for selectively activating each of said light permeable zones of said first shutter means, whereby a light beam passing through said second lens means forms at least a spot of light on said media at a position depending on a selected light permeable zone of said first shutter means and a selected light permeable region of said second shutter means.

11. A light scanning device according to claim 8, wherein said means for reading said spot of light comprises a beam splitter arranged on said optical axis between said first shutter means and said first lens means for receiving a light beam reflected at said light recording media and diverging from said optical axis, said light receiving means receiving the diverged light beam and outputting an electric signal, means for processing said electric signal in relation to said means for selectively activating each of said light permeable zones of said first shutter means, and means for selectively activating each of said light permeable regions of said second shutter means.

12. A light scanning device according to claim 11, wherein said light receiving means comprises a plurality of light receiving elements arranged in correspondence with a disposition of said light permeable zones of said first shutter means.

13. A light scanning device according to claim 1, wherein a further lens means is provided on said optical axis between said second lens means and said light recording media, to generate a sharp spot of light.

* * * * *